United States Patent [19]

Fukuda et al.

[11] Patent Number: 4,759,977

[45] Date of Patent: * Jul. 26, 1988

[54] FLEXIBLE CARBON MATERIAL

[75] Inventors: Hiroyuki Fukuda; Yukihiro Shibuya; Kiyomi Ohuchi; Masumi Sagi; Naohiro Murayama; Masatomo Shigeta, all of Iwaki, Japan

[73] Assignee: Kureha Kagaku Kogyo Kabushiki Kaisha, Tokyo, Japan

[*] Notice: The portion of the term of this patent subsequent to Jul. 26, 2005 has been disclaimed.

[21] Appl. No.: 898,385

[22] Filed: Aug. 20, 1986

[30] Foreign Application Priority Data

Nov. 14, 1985 [JP] Japan .................................. 60-255779

[51] Int. Cl.$^4$ ........................... B32B 3/00; B32B 7/14; B32B 5/16
[52] U.S. Cl. .................................... 428/283; 428/288; 428/289; 428/290; 428/291; 428/408; 428/172; 264/29.1; 162/136; 162/168.1; 162/171; 201/35; 427/227; 427/228
[58] Field of Search ............... 428/408, 167, 172, 288, 428/283, 289, 290, 291; 264/29.1; 427/227, 228; 423/447.1, 447.2; 429/12, 44, 162, 210, 253

[56] References Cited

U.S. PATENT DOCUMENTS 3,998,689  7/1976  Kitago et al. ........................ 162/136
4,064,207 12/1977  DeCrescente et al. ......... 428/408 X
4,115,528  9/1978  Christner et al. ............ 423/447.1 X
4,365,008 12/1982  DeCasperis et al. ........... 428/408 X
4,426,340  1/1984  Goller et al. ........................ 264/29.1

FOREIGN PATENT DOCUMENTS

WO 80/02818 12/1980 PCT Int'l Appl. .

OTHER PUBLICATIONS

Chemical Abstracts, vol. 101, No. 12 (1984).

Primary Examiner—P. C. Ives
Attorney, Agent, or Firm—Nixon & Vanderhye

[57] ABSTRACT

A flexible carbon material is produced by carbonizing a composite material comprising carbon fibers having an average length of 6 to 50 mm and a binding agent. Carbon lumps are derived from the binding agent and are dispersed in a matrix of the carbon fibers so as to restrain a plurality of the carbon fibers while yet permitting relative slippage to occur as between the carbon fibers and carbon lumps such that the carbon fiber material exhibits a flexibility ratio D/d of not greater than 200 (where D is the diameter of curvature of the carbon material, when bent, just before breakage, and d is the thickness of the carbon material). The carbon fibers and lumps are preferrably present in an amount of from 5 to 50%, and 5 to 70% by volume, respectively, based upon the total volume of the carbon material.

7 Claims, 2 Drawing Sheets x400 x300 x 300

FLEXIBLE CARBON MATERIAL

BACKGROUND OF THE INVENTION

The present invention relates to a flexible carbon material and a process for producing the same. More specifically, the present invention relates to a flexible carbon material produced by carbonizing a composite material comprising carbon fibers and a binding agent and to a process for producing the flexible carbon material.

In recent years, carbon materials based on carbon fibers have been used in various industrial fields, and while being accompanied by technological progress of and demands, improvements to the productivity and the physical specificities of the carbon materials are still sought.

Carbon materials are generally excellent in physical properties as basic materials, for instance, heat-resistance, corrosion-resistance, electric conductivity, mechanical strength, etc.

Hitherto, research and development relating to carbon materials have been restricted to those areas involving the improvement of the above-mentioned physical properties. Research into carbon materials having greater flexibility have in general not been carried out.

As a result of the present inventors' studies concerning flexible carbon materials, it has been found that carbon material having the flexibility of not more than 200 in the value of the ratio (D/d) of the minimum diameter of curvature (D) of said flexible carbon material just before the breakage thereof at the time of bending said flexible carbon material to the thickness (d) of said flexible carbon material, is available by carbonizing a composite material comprising carbon fibers of not less than 1 mm in average length and a binding agent. Such a finding has never been presumed by the above-mentioned research hitherto carried out, and also has never been intended.

The objective of the present invention is to provide a flexible carbon material having a novel microstructure and a process for producing the same.

SUMMARY OF THE INVENTION

In a first aspect of the present invention, there is provided a flexible carbon material produced by carbonizing a composite material comprising carbon fibers and a binding agent, wherein carbon lumps derived from said binding agent are dispersed in a matrix of said carbon fibers and restrain a plurality of said carbon fibers having the average length of not less than 1 mm and said carbon fibers are united with said carbon lumps so as to freely slide.

In a second aspect of the present invention, there is provided a process for producing a flexible carbon material comprising preparing a composite material comprising a matrix of carbon fibers of not less than 1 mm in the average length and a binding agent, heat-molding said composite material under a pressure, and calcining the thus molded composite material under a reduced pressure or in an inert gaseous atmosphere so that carbon lumps derived from said binding agent are dispersed in said matrix of said carbon fibers and restrain a plurality of said carbon fibers, and said carbon fibers are united with said carbon lumps so as to freely slide.

BRIEF EXPLANATION OF DRAWINGS

Of the attached drawings.

DETAILED DESCRIPTION OF THE INVENTION

Figure 1:
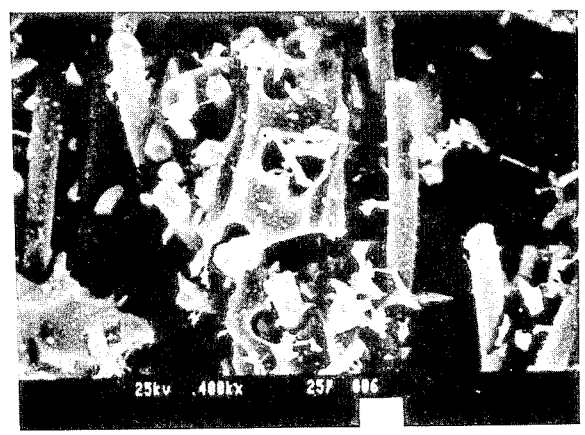
FIGS. 1 and 3 are microphotographs showing the microstructure of the flexible carbon materials obtained respectively by Examples 1 and 3 of the present invention (400 times in FIG. 1 and 300 times in FIG. 3)

The flexible carbon material according to the present invention is the product obtained by carbonizing a composite material comprising carbon fibers of not less than 1 mm in average length and a binding agent, wherein carbon lumps derived from the binding agent are dispersed in a matrix of the carbon fibers and restrain a plurality of the carbon fibers and the carbon fibers are united with the carbon lumps so as to freely slide within the carbon lumps.

The microstructure of the flexible carbon material according to the present invention is shown in the electron microphotographs and the polarizing microphotograph of the attached drawing. As is clearly seen in the photographs, the carbon lumps derived from the binding agent are almost individually dispersed, and although the lumps restrain the carbon fibers, there are clearances between the carbon fibers and the above-mentioned carbon lumps in that part.

Namely, although almost all the carbon fibers are restrained by the carbon lumps derived from the binding agent, the carbon fibers are not bound to the carbon lumps chemically and physically. Accordingly, the carbon fibers slide within the above-mentioned carbon lump when an external force is used on the flexible carbon material.

According to the presence of the above-mentioned structure, the carbon material of the present invention exhibits a flexibility which permits displacement of the carbon fibers when the carbon fiber material is subjected to an external force. The above-mentioned flexibility according to the present invention is shown as the value of the ratio (D/d) of not more than 200, wherein D is the diameter of the curvature of the carbon material, when bent, just before the breakage (the minimum diameter of the curvature) and d is the thickness of the carbon material.

Although the flexible carbon material according to the present invention has the above-mentioned flexibility, the other physical properties are almost the same as or superior to those of the conventional carbon papers (for instance, refer to U.S. Pat. No. 3,998,689, for instance, the tensile strength, the electrical resistance and the apparent density of the carbon material according to the present invention are respectively, not less than 0.05 kgf/mm², not more than 900 mΩ·cm and from 0.2 to 1.3 g/cc. Not less than 80% by volume of the pores in the carbon material of the present invention have the pore diameter of from 10 to 400 μm. The conventional carbon fiber paper does not show the above-mentioned flexibility.

It is necessary that the average length of the carbon fibers in the raw material of the flexible carbon material is not less than 1 mm, and the average length is preferably not less than 3 mm and more preferably not less than 6 mm. However, the longest length thereof is preferably not more than 50 mm, because the composite material thus prepared becomes heterogeneous in the case where the average length of the carbon fibers is over 50 mm.

The diameter of the carbon fibers is preferably from 4 to 25 μm.

The above-mentioned carbon fibers may be oriented randomly in the flexible carbon material two-dimensionally or three-dimensionally, and the ratio of the volume occupied by the carbon fibers in the carbon material to the total volume of the carbon material is 5 to 50%, preferably 10 to 40%.

Although it is not necessary that the carbon lumps derived from the binding agent are in a spherical form, in the case where it is regarded as sphere, the diameter of the lumps is 2 to 200 times of the diameter of the carbon fibers, preferably 3 to 100 times thereof, and the ratio of the volume occupied by the carbon lumps in the flexible carbon material to the total volume of the carbon material of the present invention is 5 to 70%, preferably 10 to 60%.

In the production of the flexible carbon material according to the present invention, a composite material comprising carbon fibers of not less than 1 mm in average length and a binding agent is prepared at first. As the carbon fibers used according to the present invention, various fibers such as those of polyacrylonitriles, of rayons, of phenol resins, of isotropic pitches, of anisotropic pitches, etc. may be mentioned, and they are used after being treated at a temperature of not less than 1000° C., preferably not less than 1500° C., and more preferably not less than 2000° C.

The carbon fibers used according to the present invention are not less than 1 mm, preferably not less than 3 mm and more preferably 6 mm to 50 mm in average length and are 4 to 25 μm in diameter.

As the binding agent, an organic substance having a carbonizing yield of not less than 10%, preferably not less than 20%, for instance, one or more kinds of phenol resin, furan resin, pitch of petroleum series or coal series, polyvinyl chloride, polyacrylonitrile, rayon, polymer of siloxane series, etc. are used.

In order to prepare a composite material comprising the above-mentioned carbon fibers and the binding agent, various methods may be used. For instance, after impregnating a carbon fiber matrix (for instance manufactured by wet process or dry process to be a sheet of paper) with a solution prepared by dissolving the binding agent in a solvent, the solvent is removed from the sheet of carbon fiber paper, or the binding agent is uniformly added to the carbon fiber matrix by pouring the powdery form, sheet-form or pellet-form binding agent into the carbon fiber matrix while heating. Or, the binding agent may be preliminarily applied on the surface of the carbon fibers. For instance, the carbon fiber matrix may be prepared from the thus coated carbon fibers and then the binding agent may be added to the thus prepared carbon fiber matrix to obtain the composite material. In such a case, when the surface of the carbon fibers are coated with a high polymeric substance of a low carbonizing yield, a favorable result is obtained because of the formation of the space between the carbon fibers and the carbon lumps derived from the binding agent during the subsequent steps of thermal molding under a pressure and calcining. For instance, after mixing the fibrous or granular high synthetic polymer having the low carbonizing yield with the carbon fibers and preparing the carbon fiber matrix therefrom by paper-manufacturing method, the binding material is added to the thus prepared carbon fiber matrix, thereby preparing the composite material. As such a high synthetic polymer, polyvinyl alcohol may be mentioned. In addition, one or more kinds of carbon black, graphite particles or carbon particles may be used as an aggregate together with the carbon fibers.

Further, in the case where the carbon fibers sheafed by a sheafing agent are used as they are, the desired physical property can not be obtained even by calcining the material after molding.

It has been found that, in such a case, a favorable product is available by using the carbon fibers from which the sheafing agent has been removed preliminarily by washing the carbon fibers with a solvent.

In addition, since there may be cases where the sheafing agent still remains on the carbon fibers after only washing them with a solvent, it is preferable to treat the carbon fibers at a high temperature after washing them with a solvent and thereby make the surface of the carbon fibers inactive.

The composite material prepared in the above-mentioned manner is thermally molded under the conditions of a molding temperature of not less than 100° C., a molding pressure of not less than 2 kgf/cm$^2$G and a pressure retention time of not less than one min. Thereafter, the thus molded article is wholly carbonized by calcining under a reduced pressure or in an inert gaseous atmosphere according to the conventional method. The temperature of calcination is not less than 850° C., preferably not less than about 1500° C. and most preferably not less than about 2000° C.

In the carbon material thus obtained according to the present invention, the carbon lumps derived from the binding agent and the carbon fibers are not completely stick to each other and the carbon fibers can slide within the carbon lump derived from the binding agent because of the presence of a space between the binding part of the two components. Consequently, the carbon material according to the present invention has a flexibility which has never been considered in the conventional carbon fiber paper, etc. Further, the other specific properties of the carbon material according to the present invention are also not at all inferior to those of the conventional carbon fiber paper. The specific properties of the flexible carbon material according to the present invention are compared with those of the conventional carbon paper (refer to U.S. Pat. No. 3,998,689) in Table 1.

As is clearly seen in Table 1, the conventional carbon fiber paper scarcely shows any flexibility (as that defined above), and on the other hand, the flexible carbon material of the present invention is excellent in flexibility, and the other specific properties are retained in the same level. The reason why the conventional carbon fiber paper does not show flexibility is considered to be due to the fact that the carbon lumps derived from the binding agent adheres closely to the carbon fibers.

TABLE 1

|  | Flexible carbon fiber paper according to the present invention | Conventional carbon fiber paper according to U.S. Pat. No. 3,998,689 |
| --- | --- | --- |
| Flexibility (D/d)(cm/cm) | 30–200 | 500–1000 |
| Apparent density (g/cc) | 0.3–1.2 | 0.3–0.8 |
| Gas-permeability (ml/cm$^2$ · hr · mmAq.) | 1–10$^5$ | 10$^2$–10$^5$ |
| Pore diameter (μm) | 10–200 | 10–200 |
| Linear thermal expansion coefficient (1/°C.) | 3.4 × 10$^{-6}$ | 4.5 × 10$^{-6}$ |

TABLE 1-continued

|  | Flexible carbon fiber paper according to the present invention | Conventional carbon fiber paper according to U.S. Pat. No. 3,998,689 |
| --- | --- | --- |
| Resistance to hot water | very large | very large |
| Electrical resistance (mΩ · cm) | 20–900 | 20–900 |
| Tensile strength (Kgf/mm$^2$) | 0.1–0.3 | 0.4–0.7 |
| Tensile elastic modulus (Kgf/mm$^2$) | 10–30 | 60–110 |

Namely, hitherto the improvement of the mechanical strength and the reduction of the electric resistance have been required for the carbon fiber paper and accordingly, it has been desired to the present that the carbon lumps and the carbon fibers are mutually adhered closely.

The flexible carbon material according to the present invention has the same usefullness in the same usage of the conventional carbon materials and in addition, it is particularly useful in the fields wherein flexibility is requested together with heat-resistance, corrosion-resistance, conductivity and mechanical strength. The respective uses will be clearly understandable for the person skilled in the art.

The present invention will be explained more in detail while referring to the non-limitative Examples.

EXAMPLE 1

Seven parts by weight of carbon fibers (made by KUREHA KAGAKU KOGYO Co., Ltd., under the trade name of C206S, 6 mm in length and from 14 to 16 μm in diameter, and produced by calcining isotropic pitch fibers at 2000° C.) and one part by weight of polyvinyl alcohol fibers (made by KURARE Co., Ltd., under the registered trade name of KURARE-VINYLON VBP 105-2, 3 mm in length) were dispersed in water and manufactured into sheets of paper by a conventional paper machine and then dried. After impregnating the thus manufactured sheet of carbon fiber paper with a 30% by weight solution of a phenol resin dissolved in methanol, the solvent was removed from the sheet of carbon fiber paper by drying thereof. After thermally molding the thus treated sheet of carbon fiber paper in a prescribed mold at 130° C. under a pressure of 10 kgf/cm$^2$G for 20 min, the thus molded material was calcined at 2000° C. under a reduced pressure to obtain a thin plate-like product of 0.3 mm in thickness.

The flexibility (D/d), the apparent density, the gas-permeability, the pore-diameter, the linear thermal expansion coefficient, the electric resistance, the tensile strength and the tensile elastic modulus of the thus obtained product were as follows:

50 cm/cm, 0.9 g/cc, 50 ml/cm$^2$·hr·mmAq, 10–140 μm, $3 \times 10^{-6}$/°C., 50 mΩ·cm, 0.24 kgf/mm$^2$ and 40 kgf/mm$^2$, respectively.

The thus obtained product showed no transformation when soaked in hot water.

Figure 2:
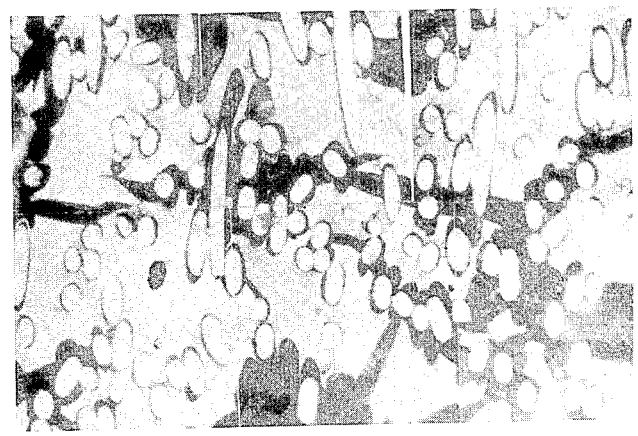
FIG. 2 is a polarizing microphotograph showing the microstructure of the flexible carbon material obtained by Example 1 (300 times).

An electron microphotograph and a polarizing microphotograph of the thus obtained product (carbon material) are respectively shown in FIG. 1 and FIG. 2. As are clearly seen in the photographs, the carbon lumps derived from the binding agent are dispersed within the matrix of the carbon fibers, and clear space is seen between the carbon lump and the carbon fibers.

In addition, the average size of the carbon lump derived from the binding agent is 150 μm, and the ratio thereof to the diameter of the carbon fiber is 150/15=10. The ratio of volume occupied by the carbon fibers and the carbon lumps derived from the binding agent to the total volume of the product was 37.5% and 21%, respectively.

EXAMPLE 2

A sheet of carbon fiber paper was manufactured by scattering and settling the same carbon fibers as in Example 1 with wind. After impregnating the thus obtained sheet of carbon fiber paper with the same solution of the phenol resin as in Example 1 by spraying, the solvent was removed from the sheet by drying. After thermally molding the thus impregnated sheet of carbon fiber paper in a prescribed mold, the thus molded sheet of carbon fiber paper was calcined at 2000° C. under a reduced pressure to obtain the product (carbon material) of 3 mm in thickness.

The flexibility, the apparent density, the gas-permeability, the pore diameter, the linear thermal expansion coefficient, the electric resistance, the tensile strength and the tensile elastic modulus of the product were respectively as follows:

35 cm/cm, 0.4 g/cc, 1100 ml/cm$^2$·hr·mmAq, 10–180 μm $3.1 \times 10^{-6}$/°C., 350 mΩ·cm, 15 kgf/mm$^2$ and 15 kgf/mm$^2$.

The product showed no transformation when soaked in hot water.

The carbon lumps derived from the binding agent in the product were dispersed in the matrix of the carbon fibers, and a clear space was observed between the carbon lump and the carbon fibers.

In addition, the size of the carbon lumps was 80 μm on the average, the ratio thereof to the diameter of carbon fiber was 80/15=5.3 and the ratio of the volume occupied by the carbon fibers and the carbon lumps derived from the binding agent to the total volume of the product were respectively 12.5% and 14.3%.

EXAMPLE 3

Seven parts by weight of carbon fibers (obtained by washing with acetone and calcining at 2000° C. those made by Union Carbide Corp. under the registered trade name of THORNEL, 6 mm in length and 8 μm in diameter) and one part by weight of polyvinyl alcohol fibers (the same as in Example 1) were dispersed in water, manufactured into a sheet by an ordinary paper machine and dried to obtain a sheet of carbon fiber paper. After impregnating the sheet of carbon fiber paper with the same 30% by weight solution of a phenol resin dissolved in methanol as in Example 1, the solvent was removed from the sheet by drying. After thermally molding the thus impregnated sheet of carbon fiber paper in a prescribed mold at 130° C. under a pressure of 8 kgf/cm$^2$G for 20 min, the thus molded material was calcined at 2000° C. under a reduced pressure to obtain a thin plate-like product of 0.3 mm in thickness.

The flexibility (D/d), the apparent density, the gas-permeability, the pore diameter, the linear thermal expansion coefficient, the electrical resistance, the tensile strength and the tensile elastic modulus of the product were respectively as follows:

60 cm/cm, 0.8 g/cc, 130 ml/cm$^2$·hour·mmAq, 10–140 μm,

3×10$^{-6}$/°C., 35 mΩ·cm, 0.25 kgf/mm$^2$ and 36 kgf/mm$^2$.

The product showed no transformation when soaked in hot water.

Figure 3:
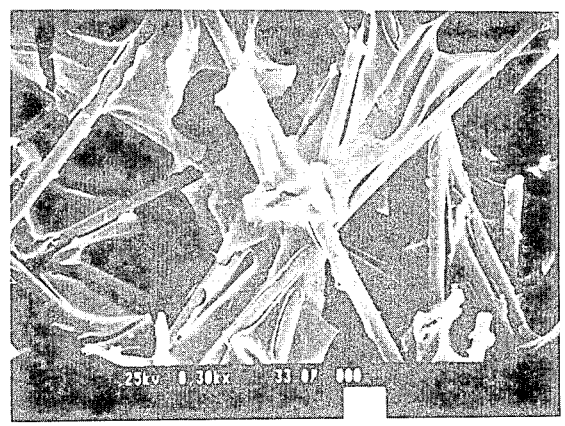

An electron microphotograph of the thus obtained flexible carbon material is shown in FIG. 3. As will be clearly seen in the photograph, the carbon lumps derived from the binding agent are dispersed in the matrix of the carbon fibers, and there are clear spaces between the carbon lumps and the carbon fibers.

In addition, the size of the carbon lumps derived from the binding agent was 240 μm on the average, and the ratio thereof to the diameter of the carbon fibers was 240/8=30. The ratio of volume occupied by the carbon fibers and the carbon lumps derived from the binding agent to the total volume of the product were respectively 28% and 17.1%.

EXAMPLE 4

After manufacturing a sheet of carbon fiber paper by dispersing 7 parts by weight of the same carbon fibers as in Example 1 and 1 part by weight of the same polyvinyl alcohol fibers as in Example 1 and using an ordinary paper machine, the thus obtained sheet was dried and a powdery phenol resin was supplied onto the thus dried sheet of carbon fiber paper at an aerial weight of 3 kg/m$^2$.

After thermally molding the thus treated sheet of carbon fiber paper in a prescribed mold under the same conditions as in Example 1, the thus molded material was calcined at 2000° C. under a reduced pressure to obtain a product of 3 mm in thickness.

The flexibility (D/d), the apparent density, the gas-permeability, the pore diameter, the thermal expansion coefficient, the electric resistance, the tensile strength and the tensile elastic modulus of the thus obtained product were respectively as follows:

170 cm/cm, 1.08 g/cc, 10 ml/cm$^2$·hour·mmAq, 10 to 80 μm 3.5×10$^{-6}$/°C., 10 mΩ·cm, 0.6 kgf/mm$^2$ and 58 kgf/mm$^2$.

The product showed no transformation when soaked in hot water.

The electron microphotograph and the polarizing microphotograph of the product show that the carbon lumps derived from the binding agent are dispersed in the matrix of the carbon fibers and that there are clear spaces between the carbon lumps and the carbon fibers.

In addition, the size of the carbon lumps derived from the binding agent was 210 μm on the average, and the ratio thereof to the diameter of the carbon fibers was 210/15=14, and the ratio of volume occupied by the carbon fibers and the carbon lumps derived from the binding agent to the total volume of the product were respectively 34.4% and 35.0%.

What is claimed is:

1. A flexible carbon material produced by carbonizing a composite material comprising carbon fibers having an average length of 6 to 50 mm which have been treated at a temperature of not less than 1500° C. and a binding agent, wherein carbon lumps derived from said binding agent are dispersed in a matrix of said carbon fibers and restrain a plurality of said carbon fibers while yet permitting relative slippage to occur as between said carbon fibers and said carbon lumps, so as to provide a flexibility ratio D/d of said carbon material of not more than 200, where D is the diameter of said flexible carbon material, when bent, just prior to breakage, and d is the thickness of said carbon material, and wherein said carbon material exhibits tensile strength, electrical resistance, and apparent density values, respectively, of not less than 0.05 kgf/mm$^2$, not more than 900 mΩ·cm and 0.2 to 1.3 g/cc, and wherein not less than 80% by volume of pores in said flexible carbon material has a diameter of 10 to 400 μm.

2. A flexible carbon material according to claim 1, wherein the diameter of said carbon fibers is 4 to 25 μm.

3. A flexible carbon material according to claim 1, wherein said carbon fibers are present in an amount of 5 to 50% of the total volume of said carbon material.

4. A flexible carbon material according to claim 3, wherein said carbon fibers are present in an amount of 10 to 40% by volume.

5. A flexible carbon material according to claim 1, wherein when in the form of said lumps derived from said binding agent is regarded as a sphere, said lumps have a diameter of 2 to 200 times the diameter of said carbon fibers, and wherein said lumps are present in an amount of 5 to 70% of the total volume of said carbon material.

6. A flexible carbon material according to claim 5, wherein the diameter of said lumps is 3 to 100 times the diameter of said carbon fibers, and wherein the lumps are present in an amount of 10 to 60% by volume.

7. A flexible carbon sheet comprised of (a) a matrix of carbon fibers having a mean length of not less than 6 mm and not greater than 50 mm and a diameter of between 4 to 25 μm, and (b) an organic binding agent having a carbonizing yield of not less than 10% dispersed throughout said matrix in the form of carbonized lumps having diameters of between 2 to 200 times the diameter of said carbon fibers, wherein said lumps retain said carbon fibers in said matrix yet are physically and chemically unattached thereto so as to allow relative slippage to occur as between said lumps and said carbon fibers such that said carbon sheet exhibits a flexibility ratio D/d of not greater than 200, wherein D is the diameter of curvature of said sheet, when bent, just before breakage, and d is the thickness of said carbon sheet, and wherein said carbon fibers and lumps are present in an amount of from 5 to 50%, and 5 to 70% by volume, respectively, based upon the total volume of said carbon sheet.

* * * * *